United States Patent
Ramp et al.

(10) Patent No.: US 6,193,604 B1
(45) Date of Patent: Feb. 27, 2001

(54) CONCAVE FOR AN AGRICULTURAL COMBINE

(75) Inventors: Benjamin Earl Ramp, Geneseo; Daniel Marc Heim, Moline, both of IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/348,848

(22) Filed: Jul. 7, 1999

(51) Int. Cl.[7] .................................................. A01F 12/00
(52) U.S. Cl. ........................................... 460/110; 460/109
(58) Field of Search .................................. 460/45, 46, 98, 460/107, 108, 109, 110, 141, 142, 71, 72

(56) References Cited

U.S. PATENT DOCUMENTS

| | | | |
|---|---|---|---|
| 1,821,316 | * 9/1931 | Oakes | 460/109 |
| 3,871,384 | * 3/1975 | Depauw et al. | 460/109 |
| 3,995,645 | * 12/1976 | Rowland-Hill | 130/27 |
| 4,031,901 | 6/1977 | Rowland-Hill . | |
| 4,078,571 | * 3/1978 | Todd et al. | 130/27 T |
| 4,108,150 | * 8/1978 | Shaver | 130/27 H |
| 4,165,751 | 8/1979 | Todd . | |
| 4,305,407 | 12/1981 | DeCoene . | |
| 4,495,954 | 1/1985 | Yarbrough . | |
| 4,497,328 | 2/1985 | Alm et al. . | |
| 4,988,326 | 1/1991 | Bennett . | |
| 5,024,631 | 6/1991 | Heidjann et al. . | |
| 5,057,056 | 10/1991 | Kambeitz . | |
| 5,427,573 | * 6/1995 | Rutt et al. | 460/142 |
| 5,569,080 | 10/1996 | Estes . | |
| 5,613,907 | * 3/1997 | Harden | 460/109 |

FOREIGN PATENT DOCUMENTS

| | | |
|---|---|---|
| 131 444 | 4/1901 | (DE) . |
| 678 879 | 7/1936 | (DE) . |
| 40 35 471 | 5/1991 | (DE) . |
| 0 765 597 | 4/1997 | (EP) . |
| 650 777 | 2/1929 | (FR) . |
| 1 074 372 | 10/1953 | (FR) . |
| 405153846 | * 6/1993 | (JP) .......... 460/107 |

OTHER PUBLICATIONS

Database WPI, Section PQ, Week 198451, Derwent Publications Ltd., London, GB, Class P12, AN 1981–317508, XP002147287date: Feb. 1985.

* cited by examiner

Primary Examiner—Robert E. Pezzuto
Assistant Examiner—Nathan Mammen

(57) ABSTRACT

A concave for an agricultural combine having an array of straight rectangular bars and straight round bars spaced from one another and extending axially of the rotor or cylinder to form a threshing surface and to form openings therebetween for grain to pass through. The round bars shed crop material to reduce plugging while the rectangular bars provide an aggressive threshing edge. Smaller diameter wires can be inserted between the round and rectangular bars to reduce the opening size for use with small grains.

7 Claims, 3 Drawing Sheets

CONCAVE FOR AN AGRICULTURAL COMBINE

BACKGROUND OF THE INVENTION

1. Field of the Invention

The present invention is related to a concave for an agricultural combine and in particular to a concave that sheds crop material to avoid plugging when harvesting green plant material, high moisture corn or a high volume throughput of dry crop material.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

There are two basic types of combines: (1) a conventional combine having a transverse threshing cylinder followed by a separator for separating the threshed crop, and (2) a rotary combine having a rotor and rotor casing for both threshing and separating the harvested crop. The rotating transverse threshing cylinder is mounted in close proximity to a concave. The threshing cylinder, in conjunction with the concave, threshes the crop material. The concave generally comprises a series of straight bars extending parallel to the cylinder axis of rotation. Curved wires project through the bars and extend circumferentially through the concave. A concave of this type forms a grate through which the majority of the threshed grain and chaff fall onto a collecting assembly where it is directed to the cleaning system of the combine. U.S. Pat. No. 4,909,772 illustrates such a concave.

Rotary combines have a rotary crop processing unit formed by a rotor and a casing surrounding the rotor. The rotary crop processing unit has an inlet transition section for pulling crop material into a rotary crop processing unit from the feederhouse. The rotary crop processing unit includes a threshing section for threshing the crop material and a separating section for separating the grain from the threshed crop material. The bottom of the casing is provided with a series of grates through which the grain and chaff fall from the casing. The grates, located beneath the threshing section of the rotary crop processing unit, comprise a concave. Such a concave is disclosed in U.S. Pat. No. 4,499,908. In this patent, one side of the concave is pivotally mounted to the crop processing unit and the other side is adjustably mounted to the crop processing unit to control the clearance between the concave and the rotor.

Crop material, especially green crop material and high volume crop material, tends to plug the concave, not allowing grain to pass through the concave and thus reducing capacity and threshing ability. Furthermore, in some rotary combines, it is necessary to change between two different concaves, with different sized openings, when changing between harvesting of small and large grain crops.

SUMMARY

Accordingly, it is an object of the present invention to provide a concave having the ability to shed crop material to prevent plugging of the concave for a wide range of crops and crop conditions.

It is a feature of the invention to use a combination of straight rectangular bars and straight round bars for the concave threshing surface. The bars extend parallel to the rotational axis of the cylinder or rotor. The round bars have a rounded threshing surface that is capable of easily shedding any crop material while the rectangular bars have flat surfaces to provide an aggressive threshing edge.

It is a further feature of the concave to place additional straight wires between, and parallel to, the rectangular and round bars. The wires reduce the concave opening size for use with small grain crops. The wires are individually removable, resulting in a large number of wire location combinations that allow the separation level of the concave to be varied, to maximize performance of the combine in a specific crop condition. By adding or removing wires, the same concave can be used optimally with both large and small grain crops. This avoids the need to have separate concaves for different crops.

DETAILED DESCRIPTION

Figure 1:
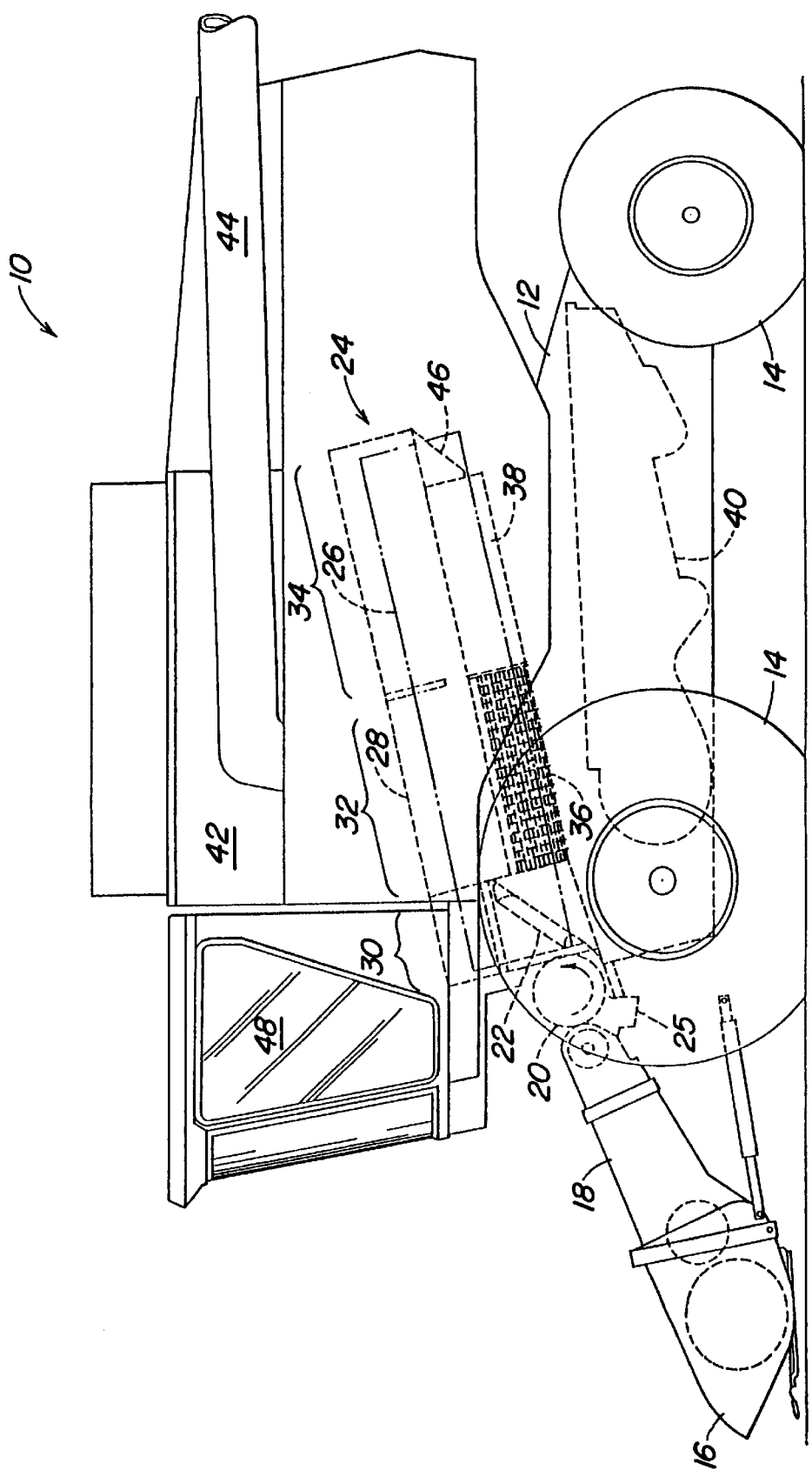
FIG. 1 is a semi-schematic side elevation of a self propelled combine having a rotary processing unit.

FIG. 1 shows an agricultural combine 10 comprising a supporting structure 12 having ground engaging means extending from the supporting structure, such as wheels 14. A harvesting platform 16 is used for harvesting a crop and directing it to a feederhouse 18. The harvested crop is directed by the feederhouse 18 to a beater 20. The beater directs the crop upwardly through the inlet transition section 22 to the rotary crop processing unit 24. A rock trap 25 is positioned between the feederhouse and the beater 20.

The rotary crop processing unit 24 threshes and separates the harvested crop material. It comprises a rotor or rotating member 26 radially surrounded by a casing 28 that together define an inlet section 30, a threshing section 32 and a separating section 34. The rotor 26 comprises a hollow cylindrical drum having a plurality of crop processing elements that engage the crop and rotate it in the casing 28. The bottom of the casing has a concave 36 under the threshing section 32 and a separating grate 38 under the separating section 34.

Grain and chaff falling through the concave 36 and the separating grate 38 are directed to cleaning system 40. The cleaning system 40 removes the chaff and directs the clean grain to a clean grain elevator (not shown). The clean grain elevator deposits the clean grain in a grain tank 42. The clean grain in the tank 42 can be unloaded into a grain cart or truck by an unloading auger 44.

Threshed and separated straw is discharged from the rotary crop processing unit 24 through outlet 46 to a discharge beater (not shown). The discharge beater in turn propels the straw out the rear of the combine. The operation of the combine is controlled from operator's cab 48.

The present invention is directed to the concave 36 located under the threshing section 32 of the rotary crop processing unit 24. The concave of the present invention may also be used as a separating grate. However, other types of separating grates may be preferred.

Figure 2:
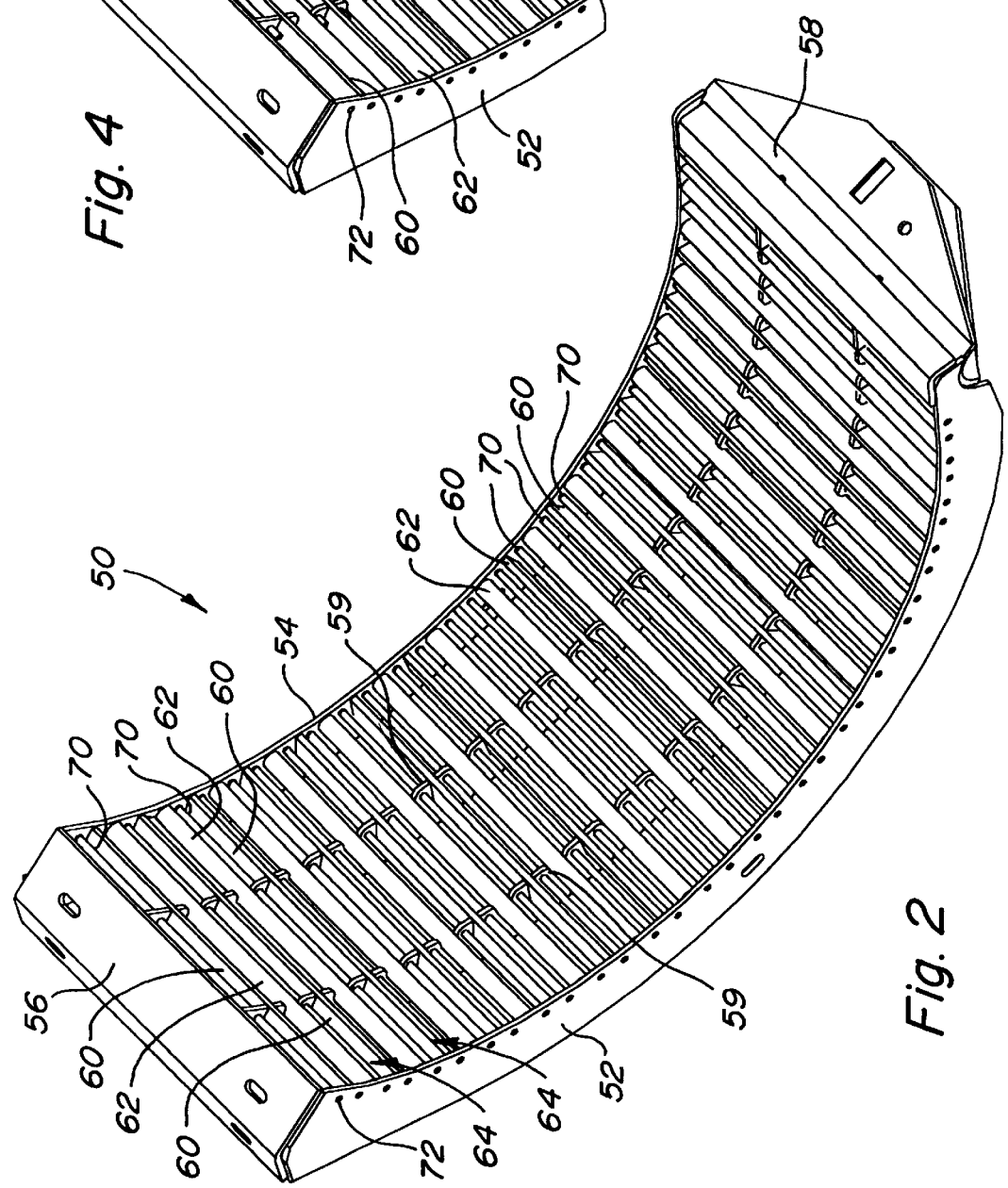
FIG. 2 is a perspective view of a concave section according to the present invention.

Three concave sections form the concave 36. A concave section 50 is shown in FIG. 2. The section 50 includes a frame having two end members 52 and 54 axially spaced from one another. The end members are curved to extend circumferentially about a portion of the rotor 26. Two straight support members 56, 58 extend between and are joined to the curved end members. Curved intermediate supports 59 are arranged between the two curved end members.

Threshing is accomplished by an array of straight rectangular bars 60 and straight round bars 62 that extend between the two curved end members 52, 54. The bars extend parallel to the axis of the rotating member 26. The bars are spaced from one another to form openings 64 therebetween for grain to pass through. The rectangular bars provide an aggressive threshing edge while the round bars provide a rounded threshing surface that is capable of shedding crop material.

Figure 3:
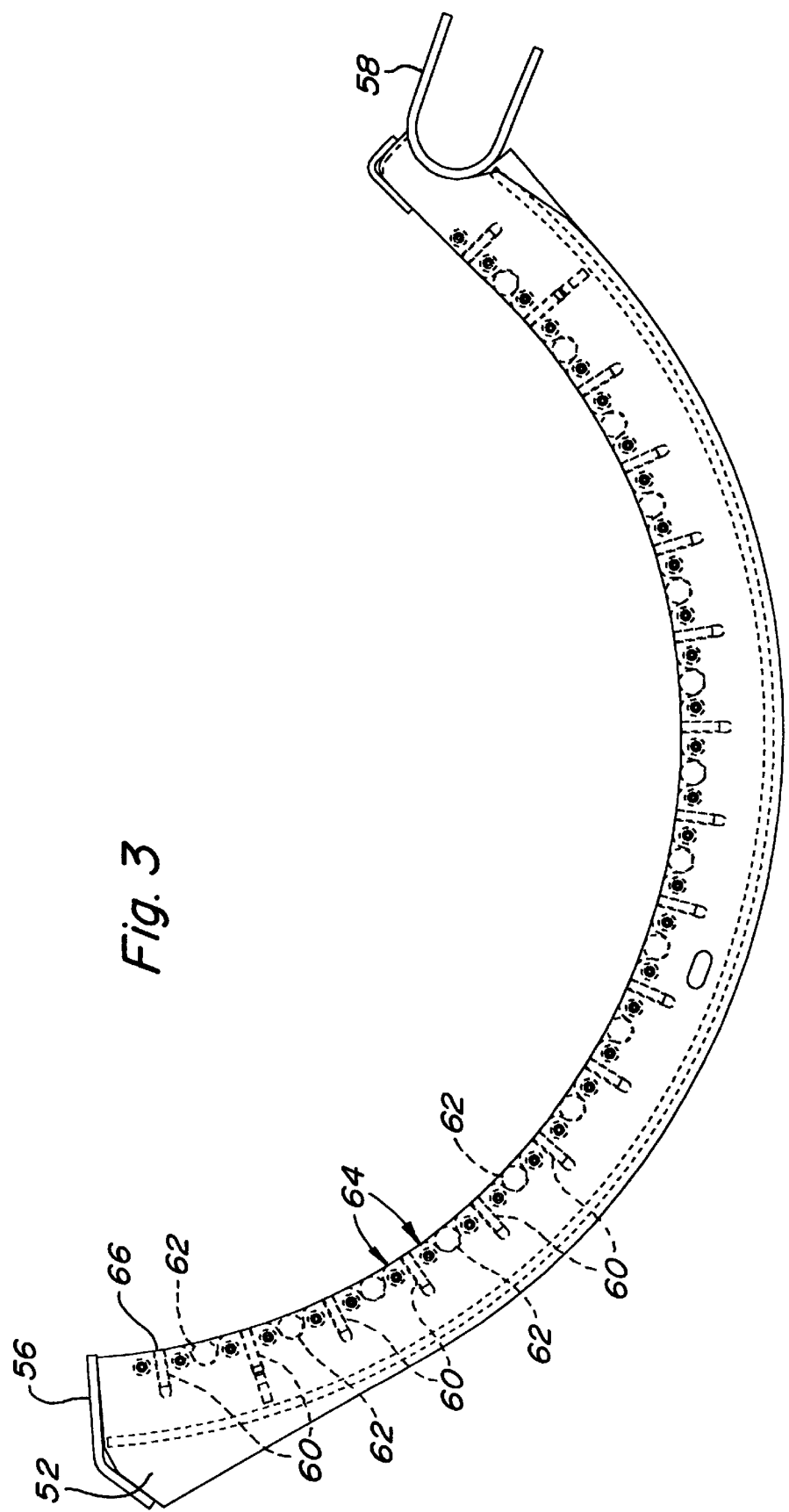
FIG. 3 is a side view of the concave section shown in FIG. 2.

The rectangular bars 60 have inner edges 66 that define an arcuate inner plane of the concave. The round bars 62 have a surface that is tangent to the arcuate inner plane as shown in FIG. 3. The rectangular and round bars are welded to the curved end members 52, 54 and to the intermediate supports 59.

In a preferred embodiment, the rectangular bars and the round bars are arranged in an alternately fashion as shown in FIG. 2. However, it will be readily appreciated that the rectangular bars and the round bars need not alternate with one another. For example, a round bar can be spaced between every two rectangular bars or vice versa to provide a concave having different characteristics. In a preferred embodiment, the rectangular bars are 6 mm thick and 38 mm deep. The round bars have a diameter of 16 mm. The bars are spaced approximately 28 mm on center, resulting in the opening 64 between adjacent bars being suitable for threshing corn and other large grains.

Figure 4:
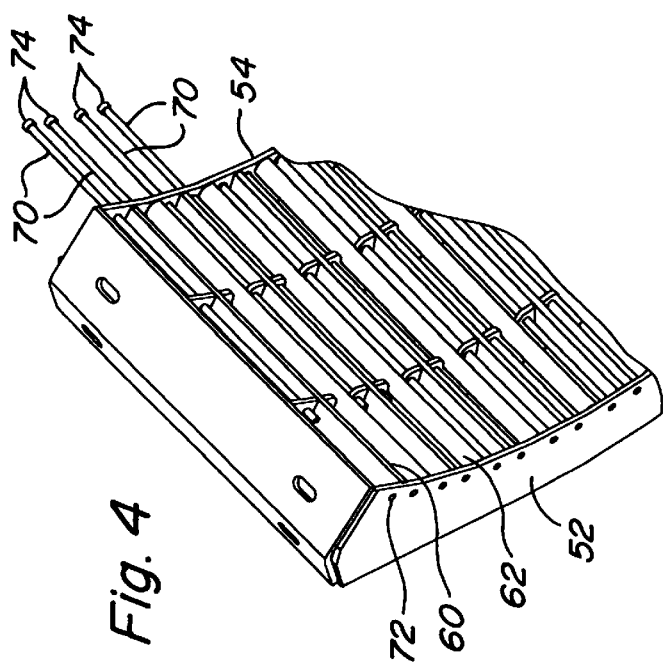
FIG. 4 is fragmentary perspective view of the concave section shown in FIG. 2 with concave wires shown partially installed.

To reduce the opening size for smaller grains, optional wires 70 can be inserted into the concave section, between the bars as shown in FIG. 4. The wires 70 are inserted through apertures 72 in the end members 52, 54 and the intermediate supports 59. The wires are disposed between the rectangular and round bars 60, 62. The wires extend parallel to the bars and reduce the size of the openings 64 in the concave. The wires 70 have an enlarged, nail like, head 74 at one end that engages the end member 54. When multiple concave sections 50 are used, the adjacent concave section engages the wire heads 74 to hold the wires in place. The concave can be utilized with all of the wires 70 in place, all of the wires 70 removed, or a select number of wires removed to provide different opening sizes in the concave.

In a rotary combine, a single long concave section can be utilized as the concave or multiple shorter concave sections can be arranged end-to-end to form the concave. When multiple concave sections are provided, each section may be configured with a different number of the wires 70 to provide different opening sizes in the different concave sections. An opening along the side of the combine supporting structure 12 provides access to the concave.

The concave of the present invention, having both round and rectangular bars, can be utilized in a conventional combine having a transverse threshing cylinder as the rotating member. However, limited access to the concave may limit the ability to add or remove the wires 70. As such, a single size opening may be required in the concave when used in conventional combines. The benefits of both round and rectangular bars in shedding crop material will still be available when the concave is used in a conventional combine.

The concave of the present invention resists plugging by virtue of the use of round bars. The curved surface of the round bars naturally resists accumulation of crop material thereon. The combination of round and rectangular bars provides more aggressive threshing action then is possible with a concave comprised solely of round bars.

The invention should not be limited to the above-described embodiment, but should be limited solely by the claims that follow.

What is claimed is:

1. A concave for a crop processing unit having a rotating member rotating about an axis that cooperates with the concave to thresh a crop, the concave comprising one or more concave sections each having:

a frame having curved end members axially spaced from one another and two straight support members joined to the curved end members; and an array of straight rectangular bars and straight round bars spaced from one another and extending axially between the curved end members forming openings therebetween for grain to pass through with the rectangular bars and the round bars being arranged in an alternating fashion with one another and being welded to the frame.

2. The concave as defined by claim 1 further comprising straight wires extending axially between the curved end members and spaced between adjacent bars to reduce the opening size between the bars.

3. The concave as defined by claim 2 wherein radially inner edges of the rectangular and round bars define an arcuate inner plane and wherein the wires are recessed radially outward from the arcuate inner plane.

4. The concave as defined by claim 2 wherein the wires are not attached to the frame whereby the wires may be individually removed from between the bars to selectively provide larger opening sizes for grain to pass through.

5. A concave for a crop processing unit having a rotating member rotating about an axis that cooperates with the concave to thresh a crop, the concave comprising one or more concave sections each having:

a frame having curved end members axially spaced from one another and two straight support members joined to the curved end members;

an array of straight bars spaced from one another and extending axially between the curved end members, the straight bars being welded to the frame and the bars forming an arcuate threshing surface, the bars having openings therebetween for grain to pass through; and straight wires extending axially between the curved end members and spaced between adjacent bars to reduce the opening size between the bars, the straight wires not being attached to the frame wherein the straight wires can be individually removed from between the bars to selectively provide larger opening sizes for grain to pass through.

6. The concave as defined by claim 5 wherein the wires are recessed radially outward from the arcuate threshing surface.

7. The concave as defined by claim 5 wherein the bars are an alternating array of rectangular and round bars.

* * * * *